United States Patent [19]

Nicholas et al.

[11] Patent Number: 4,579,883

[45] Date of Patent: Apr. 1, 1986

[54] BINDERS FOR FOUNDRY SANDS

[75] Inventors: Kenneth E. L. Nicholas, Birmingham; John O. Goring, Kettering, both of England

[73] Assignee: Scott Bader Company Limited, England

[21] Appl. No.: 580,855

[22] Filed: Feb. 16, 1984

[30] Foreign Application Priority Data

Feb. 18, 1983 [GB] United Kingdom ............... 8304617
Nov. 25, 1983 [GB] United Kingdom ............... 8331544

[51] Int. Cl.⁴ .............................................. C08L 67/06
[52] U.S. Cl. ................................. 523/148; 523/521; 525/36; 525/38; 525/39; 528/304
[58] Field of Search ............... 573/148, 521; 525/36, 525/38, 39; 528/304

[56] References Cited

U.S. PATENT DOCUMENTS

| | | | |
|---|---|---|---|
| 3,179,990 | 4/1965 | Freeman | 523/148 |
| 4,048,035 | 9/1977 | Ide | 525/38 |
| 4,246,165 | 1/1981 | Fujii | 523/148 |
| 4,366,269 | 12/1982 | Ohkawa | 523/148 |
| 4,396,571 | 8/1983 | Oyamada | 523/148 |

FOREIGN PATENT DOCUMENTS

| | | |
|---|---|---|
| 2053251 | 2/1981 | United Kingdom . |
| 2053932 | 2/1981 | United Kingdom . |
| 2099831 | 12/1982 | United Kingdom . |

Primary Examiner—John C. Bleutge
Assistant Examiner—Patricia A. Short
Attorney, Agent, or Firm—Oldham, Oldham & Weber Co.

[57] ABSTRACT

For a method of making foundry cores and moulds using a resin-coated sand in a hot box process, a crystalline unsaturated polyester resin for making the binder uses an unsaturated dicarboxylic acid, a symmetrical dicarboxylic aromatic acid and a glycol which is predominantly 1,6 hexanediol, with the possible addition of ethylene glycol and other symmetrical glycols. The molecular weight of the resin is at least 2000 and it is mixed with solid monomer such as methylene bis acrylamide or a low-viscosity liquid monomer such as diallyl phthalate or a mixture of the two. The aromatic acid is between 30 and 55 mole percent of the total acid and the acid value before addition of the monomer is below 30 mg KOH/g to result in a viscosity of not more than 30 poise at 125° C.

12 Claims, No Drawings

BINDERS FOR FOUNDRY SANDS

SPECIFIC DESCRIPTION

This invention relates to binders for foundry sands, for making both moulds and cores, although primarily the latter. Chemical binders used for foundry cores have to combine high strength for handling purposes with the ability to withstand the temperatures involved when pouring castings and then to disintegrate when the castings have solidified so that the sand, which comprises some 95 percent or more of the core, can be extracted from the interior of the castings with the minimum of effort. Synthetic resins, such as those based on phenol formaldehyde, furfuryl alcohol, or urethanes, are widely used as core binders and can, within limitations, satisfy the above requirements. The most difficult to achieve is adequate thermal decomposition of the resin to ensure that the cores disintegrate completely irrespective of the complexity of the design. Particular difficulties occur in the production of light alloy castings, for example those made with aluminium alloys, because at the low pouring temperatures used (as compared, for example, with iron founding) there is insufficient heat available to cause complete decomposition of the resins normally used as core binders. In some instances it is necessary for castings, with the cores still retained, to be heat-treated simply to complete the decomposition of the binder so that all the sand can be removed without damage to the castings.

Recently it has been proposed to used crystalline unsaturated polyester resins to coat sands used to manufacture moulds and cores for use with aluminium and light alloy castings. Several compositions have been described in British Patent Specifications Nos. 2 012 284 A; 2 053 244 A; 2 053 251 A, 2 053 932 A and 2 099 831 A; European Patent Application No. 0 056 112 and Japanese Kokai Tokkyo Koho Nos. 81/59560; 81/62644; 81/99044 and 81/109136.

The basis of these patents is a crystalline unsaturated polyester resin, having a molecular weight in the range 1000–2000, a viscosity which is below 500 poise at 30° C. above its melting point, and used with no cross-linking monomer, or with styrene or diallyl phthalate as the cross-linking monomer.

In these prior proposals, disclosed in the above-mentioned British Patent Specifications, various materials are mentioned as suitable for the preparation of the binders, including an unsaturated dibasic acid, preferably one which is sterically symmetric, such as fumaric acid, and it is also made clear that some of the unsaturated acid may be replaced by a saturated acid such as terephthalic acid, another symmetrical one. The dihydric alcohol necessary for making the ester is also mentioned as being preferably symmetric, and 1,6 hexanediol is one of the materials suggested.

In these known proposals there is emphasis, with comparative examples to support it, on the need for the average molecular weight of the polyester to be low in order to achieve a sufficiently low viscosity (at a temperature around 30° above the softening point) for the binder to coat the grains of sand adequately. For example it is suggested that an average molecular weight of between 1000 to 2000 is necessary in order to keep the viscosity below about 250 poises.

However, a low average molecular weight is not conducive to the achievement of high hot strengths, which is what is being sought in foundry moulds and cores.

A further problem in the known proposals is the slow rate of crystallisation. In some it has evidently proved necessary to add a nucleating agent and even then the polyester has had to be left for up to a week in order to allow it to develop sufficient crystallinity.

The present invention is based on the discovery that it is possible to achieve low viscosities (and therefore good sand-coating properties), indeed much lower than the figure mentioned above, without having to accept the less-than-ideal hot strength associated with a low molecular weight. According to the invention there is proposed a method of forming a mixture for making foundry moulds and cores comprising mixing a major portion of refractory foundry sand with a minor portion of a crystalline polyester binder made from a composition comprising (i) between 70 and 45 mole percent of an unsaturated dicarboxylic acid or anhydride (ii) between 30 and 55 mole percent of a symmetrical aromatic dicarboxylic acid (iii) 1,6 hexanediol and (iv) a solid or low-volatility liquid monomer (or a mixture of both), the resulting polyester before addition of the monomer having an average molecular weight greater than 2000 and an acid value not greater than 30 mg KOH/g, to obtain a viscosity not greater than 30 poise at 125° C.

The symmetry of the aromatic acid is important in achieving rapid crystallisation, and it is accordingly important to have at least the minimum proportion of that material defined above. With these proportions we are able to obtain a polyester which crystallises almost instantaneously, and without needing the addition of a specific nucleating agent, as soon as the temperature falls below about 80° C.

As will be shown by the experimental results below, this achieves good strength in the resulting moulds or cores, yet with excellent shake-out properties. Moreover the crystalline polyester resin having the properties defined is easy to prepare, crystallises rapidly, and has no tendency to agglomerate on prolonged storage, either as a powder or when stored in the form of a coated sand.

The unsaturated dicarboxylic acid preferred is fumaric acid although maleic anhydride or itaconic acid, may, less desirably, be employed. The symmetrical aromatic dicarboxylic acid is preferably terephthalic acid but others such as 4,4' dicarboxy-diphenyl may be used. 1,6 hexanediol is the chosen glycol as resins based on this glycol have low melt viscosities although small quantities, up to 10 mole % of other symmetrical glycols may be used e.g. ethylene glycol, neopentyl glycol; 1,4 butanediol, hydrogenated bisphenol A, cyclohexanedimethanol or similar materials.

The reaction between glycol and acids is performed under typical polyesterification conditions either in bulk or in the presence of an azeotroping solvent such as xylene until an acid value below 30 mg KOH/g is reached, and preferably below 22 mg KOH/g. The molecular weight of the resin as determined by gel permeation chromatography is at least 2500 and the viscosity is 30 poise at 125° C. Before cooling and solidification the resin is blended with cross-linking monomers which can either be solid, e.g. methylene bis acrylamide, or liquids with low volatility e.g. diallyl phthalate or 1,6 hexane diol fumarate, or more desirably a mixture of both types of monomer in such quantities that the resin plus monomers, when cooled to ambient temperature, remains a non-tacky solid. An inhibitor, e.g. hydroquinone or benzoquinone, is added to give stability in storage.

In the manufacture of coated foundry sands the powdered resin/monomer mixture is compounded with a free radical catalyst which is active at high temperatures, e.g. dicumyl peroxide and optionally a curing accelerator e.g. a cobalt salt of a carboxylic acid or a tertiary aromatic amine may be added. An organo functional saline containing vinyl or methacrylate groups can be added before or during the coating operation to improve resin/sand adhesion. Towards the end of the sand coating operation a wax or lubricant such as calcium stearate may be added.

These resins can be used with the normal high silica foundry sands and also with zircon sands and olivine and chromite for specialised castings.

There now follows a description of three examples of polyester resins according to the invention, followed by examples of tests carried out on the properties of samples of foundry cores incorporating these materials.

EXAMPLE 1

The crystalline polyester resin was prepared by a two-stage process. In the first stage the following ingredients were charged into a reactor equipped with a stirrer and heated to 220° C. under a stream of inert gas until the acid value had fallen to 20 mg KOH/g.

Terephthalic acid—3.0 moles
1,6 Hexanediol—10.3 moles

The reactor was cooled to below 200° C. and the following ingredients were charged:

Fumaric acid—6.88 moles

The second stage reaction was carried out at 200° C. maximum until the melt viscosity measured by an I.C.I. cone and plate viscometer at 125° C. was 25 poise. At this stage the molecular weight was 2500 as determined by gel permeation chromatography.

While still fluid the resin was blended with methylene bisacrylamide to give a monomer content of 10%. Hydroquinone was added to give an inhibitor content of 100 ppm to ensure good storage stability. This resin was designated PD 7066.

EXAMPLE 2

The procedure of Example 1 was followed except that diallyl phthalate was used as the monomer. This resin was designated PD 7005.

EXAMPLE 3

The procedure of Example 1 was followed except that both methylene bis acrylamide and diallyl phthalate were used as monomers. The resin has a final content of 9.1% of each monomer. This resin was designated ER 2465.

We shall now describe some examples of results obtained with the materials of Examples 1, 2 and 3. In each of the following examples a silica sand was first coated with the material in question. The coating practice involved heating a silica sand, such as Chelford 60, to 120° C. and transferring the sand to a batch mixer. Finely ground polyester resin was added to the sand and mixing was continued until all the resin had melted and uniformly coated the sand grains. Stirring was continued until the temperature of the mixture dropped to 90° C., whereupon the dicumyl peroxide was added. Finally, additions of cobalt octoate and Union Carbide silane A 174 were made to the sand. To break up aggregates and produce a free-flowing sand mechanical mixing continued until the coated sand had cooled to room temperature. Precoated sands produced in this manner with the crystalline unsaturated polyester resins described above were free-flowing non-sticky materials.

Solid cores were made from these pre-coated sands by blowing the sand at a pressure of about 414 kN/m$^2$ into metal coreboxes heated to between 200° and 300° C. The coated sand was heated in the corebox at controlled temperatures for periods typically between 30 and 150 seconds and the hardened core could be ejected from the box. As in the known hot box process, curing continued after stripping.

It has been found that high curing temperatures, 250° C. or preferably 300° C., are necessary to obtain maximum strength. This is shown by the data in Example 4.

EXAMPLE 4

Chelford 60 sand coated with 2 percent of the polyester PD 7066 with additions of 5 percent dicumyl peroxide, 1.6 percent cobalt octoate solution (12% cobalt), and 0.2 percent silane (Union Carbide A174) (all percentages by weight, calculated on the weight of polyester resin) was used, in the manner described above, to prepare AFS (American Foundrymen's Society) 25.4 mm square section standard tensile briquettes. In three separate tests the coated sand was blown at a pressure of 414 kN/m$^2$ into a heated die maintained at a temperature of 200°, 250° or 300° C. respectively. Different specimens were heated in the dies for periods of 30, 60, 90 120 or 150 seconds respectively and then ejected and cooled to room temperature. The specimens were loaded in the Howden Universal Test Machine calibrated to Grade A of BS.1610:1964 and their tensile strengths were determined by fracturing across the 25.4 mm square section. The results in Table I below show the improvement in strength achieved by curing at 300° C.

TABLE I

| Curing Time | Tensile Strength kN/m$^2$ Curing Temp °C. | | |
|---|---|---|---|
| secs | 200 | 250 | 300 |
| 30 | 193 | 352 | 621 |
| 60 | 386 | 704 | 1227 |
| 90 | 483 | 855 | 1034 |
| 120 | 717 | 717 | 1000 |
| 150 | 841 | 765 | 758 |

It has also been found that the silane addition, besides giving higher strength levels, helps to maintain more consistent strength and reduces the deterioration in strength on prolonged curing that occurs in the absence of the silane. This is shown by the tensile strength values in Example 5.

EXAMPLE 5

Two precoated sands were prepared as in Example 4 but the 0.2 percent addition of silane A174 was omitted from one mixture. Several standard tensile specimens, prepared as in Example 4, were cured for different periods between 30 and 150 seconds at 300° C. and the strengths after cooling to room temperature are compared in Table II below.

TABLE II

| Curing Time secs | Tensile Strength kN/m² | |
|---|---|---|
| | Addition 0.2% A174 | No Addition |
| 30 | 621 | 455 |
| 60 | 1227 | 807 |
| 90 | 1034 | 634 |
| 120 | 1000 | 552 |
| 150 | 758 | 248 |

The shake-out properties of sands coated with crystalline polyester resins were assessed using 25.4 mm square section AFS briquettes as cores in gravity die castings poured from LM4 aluminium alloy. The cores were held by projecting pins inside the die, which was pre-heated to 350° C., and molten LM4 alloy at 720° C. was poured into the die. After 3 minutes, when the alloy had solidified, the die was opened and the casting was extracted with the core intact.

A specially designed vibrator was designed to shake the core sand out of the castings. This unit consisted of a frame from which a high energy vibrator was suspended by means of a strong elastic support. A test casting and core were clamped, in an inverted position, into the frame and a series of impacts was applied by the vibrator. As a core disintegrated the sand was collected at 10 seconds intervals in a tared container and weighed. This was continued for a total of 140 seconds of vibration, or less if the core disintegrated easily. Core shake-out was determined in this manner for castings still very hot (10 minutes after removal from the die) or at room temperature after cooling overnight. The rates of sand removal, expressed as a percentage of the original core weight, are shown in Example 6.

EXAMPLE 6

Pre-coated sands containing 2.0, 1.5 and 1.0 percent crystalline polyester resin PD 7066 with additions of 5 percent dicumyl peroxide and 0.2 percent silane A174 (based on resin weight) were blown into a pre-heated corebox at 300° C. and the 25.4 mm square section cores were cast at 720° C. The percentages of sand removed during hot and cold shake-out are given in Table III below.

TABLE III

| Shake-out Time s | Core Mixture | | | | | |
|---|---|---|---|---|---|---|
| | 2.0% | | 1.5% | | 1.0% | |
| | Test Temperature | | | | | |
| | Cold | Hot | Cold | Hot | Cold | Hot |
| 10 | 75.6 | 27.8 | 100* | 30.6 | 100* | 47.7 |
| 20 | 94.7 | 36.3 | | 40.9 | | 61.3 |
| 30 | 100* | 42.6 | | 47.7 | | 70.2 |
| 40 | | 47.8 | | 53.5 | | 85.6 |
| 50 | | 52.1 | | 58.1 | | 88.4 |
| 60 | | 55.4 | | 62.3 | | 90.6 |
| 70 | | 58.6 | | 65.8 | | 92.4 |
| 80 | | 61.3 | | 73.0 | | 100* |
| 90 | | 63.7 | | 75.4 | | |
| 100 | | 65.8 | | 82.8 | | |
| 110 | | 67.7 | | 84.2 | | |
| 120 | | 69.4 | | 85.4 | | |
| 130 | | 70.9 | | 86.4 | | |
| 140 | | 72.2 | | 87.1 | | |

*Core sand completely removed

Details of a similar series of tests using sand coated with crystalline polyester resin PD 7005 are contained in Example 7.

EXAMPLE 7

Pre-coated sands, prepared as in Example 6, but using 2.0, 1.5 and 1.0 percent crystalline polyester resin PD 7005, were cured in a pre-heated corebox at 300° C. and the 25.4 mm square section cores were cast at 720° C. The percentages of sand removed during hot and cold shake-out are given in Table IV below.

TABLE IV

| Shake-out Time s | Core Mixture | | | | | |
|---|---|---|---|---|---|---|
| | 2.0% | | 1.5% | | 1.0% | |
| | Test Temperature | | | | | |
| | Cold | Hot | Cold | Hot | Cold | Hot |
| 10 | 85.9 | 39.4 | 100* | 36.6 | 100* | 45.7 |
| 20 | 100* | 48.0 | | 47.7 | | 61.6 |
| 30 | | 54.0 | | 55.4 | | 70.9 |
| 40 | | 58.9 | | 60.9 | | 77.6 |
| 50 | | 63.2 | | 65.5 | | 90.6 |
| 60 | | 66.4 | | 69.1 | | 92.8 |
| 70 | | 74.3 | | 77.5 | | 100* |
| 80 | | 76.3 | | 84.4 | | |
| 90 | | 78.0 | | 85.9 | | |
| 100 | | 84.2 | | 87.1 | | |
| 110 | | 85.0 | | 88.1 | | |
| 120 | | 85.7 | | 89.0 | | |
| 130 | | 86.4 | | 89.7 | | |
| 140 | | 87.0 | | 90.6 | | |

*Core sand completely removed.

Pre-coated sands based on any of these resins gave good core shake-out, especially when castings were first cooled to room temperature, and the surface finish of the castings was excellent, requiring minimum fettling.

The above tests were carried out with an aluminium alloy as the metal to be cast. However it should be understood that the resins and resin/sand mixes according to the invention could be used in the casting of other metals, not only non-ferrous metals and alloys, but also iron and steel.

The final example below shows that the use not of a single monomer but of a mixture of two monomers (those of Example 3 above, one solid the other a low volatility liquid) has been found to give improved hot strength in the resulting cores.

EXAMPLE 8

Chelford 60 sand was coated with 3.07% polyester ER 2465 at 140° C. and additions of 2.45% dicumyl peroxide and 0.5% silane A174 (Union Carbide), both calculated on the weight of polyester, were made at 90° C.

The coated sand was blown at 414 Kn/m² into a heated metal mould to form circular test pieces 102 mm diameter and 10 mm thick. The hot strengths after curing at 250° C. for 120 seconds were assessed in the BCIRA hot punch apparatus. This involved applying a load to the centre of the hot test piece via a punch (100 mm² area) at a speed of 50 mm/min and recording the load to failure in Newtons. Specimens made using resin ER 2465 gave results averaging 298N, whereas those made with PD 7066 gave average figures of 146 Newtons.

We claim:

1. A method of making foundry moulds and cores using a resin-coated sand which is blown into a hot box, said method comprising mixing a major portion of refractory foundry sand with a minor portion of a crystalline polyester binder made from a composition comprising (i) between 70 and 45 mole percent of an unsaturated dicarboxylic acid or anhydride, (ii) between 30 and 55 percent of a symmetrical aromatic dicarboxylic acid, (iii) a symmetrical glycol consisting of 1,6 hexanediol and up to 10 mole percent of other symmetrical glycols, and (iv) a monomer of a solid or a low volatility liquid or a mixture of both, such that the resulting polyester before addition of the monomer has an average molecular weight greater than 2000 as determined by gel permeation chromatography and an acid value of not greater than 30 mg KOH/g, to obtain a viscosity not greater than 30 poise at 125° C.

2. The method of claim 1 wherein said polyester, before addition of the monomer, has an acid value not greater than 22 mg KOH/g.

3. The method of claim 1 wherein said unsaturated dicarboxylic acid is fumaric acid.

4. The method of claim 1 wherein said unsaturated dicarboxylic acid is maleic acid or anhydride.

5. The method of claim 1 wherein said symmetrical aromatic acid is terephthalic acid.

6. The method of claim 1 wherein said symmetrical aromatic acid is 4,4' dicarboxydiphenyl.

7. The method of claim 1 wherein said monomer is methylene bisacrylamide.

8. The method of claim 1 wherein said monomer is diallyl phthalate.

9. The method of claim 1 wherein both methylene bisacrylamide and diallyl phthalate are present as said monomer.

10. The method of claim 8 wherein said two monomers are present in substantially equal quantities.

11. The method of claim 1 wherein said monomer is present to the extent of between 9 and 20% with reference to the total weight of resin and monomer.

12. The method of claim 1 wherein said polyester resin is prepared by first reacting together said symmetrical dicarboxylic aromatic acid with the 1,6 hexanediol and then adding said unsaturated dicarboxylic acid to the resulting material, and while the resultant is still fluid, adding said monomer, the resin thus formed being subsequently mixed in ground form with said sand.

* * * * *